United States Patent
Noguchi et al.

(10) Patent No.: US 8,535,405 B2
(45) Date of Patent: Sep. 17, 2013

(54) HONEYCOMB STRUCTURE

(75) Inventors: Yasushi Noguchi, Nagoya (JP); Atsushi Kaneda, Ichinomiya (JP); Takayuki Inoue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/591,494

(22) Filed: Aug. 22, 2012

(65) Prior Publication Data

US 2013/0036719 A1 Feb. 14, 2013

Related U.S. Application Data

(63) Continuation of application No. PCT/JP2011/054357, filed on Feb. 25, 2011.

(30) Foreign Application Priority Data

Feb. 24, 2010 (JP) ................................. 2010-041814

(51) Int. Cl.
*B01D 39/14* (2006.01)
*B01D 39/06* (2006.01)
*B01D 24/00* (2006.01)
*B01D 50/00* (2006.01)
*F01N 3/00* (2006.01)

(52) U.S. Cl.
USPC ............. 55/523; 422/169; 422/170; 422/171; 422/172; 422/177; 422/178; 422/179; 422/180; 422/181; 422/182; 60/297

(58) Field of Classification Search
USPC ........... 55/522–523; 422/169–172, 177–182; 60/297
See application file for complete search history.

(56) References Cited

U.S. PATENT DOCUMENTS

| 4,505,107 A | * | 3/1985 | Yamaguchi et al. ............ 60/303 |
| 4,955,129 A | * | 9/1990 | McCauley et al. .............. 29/611 |
| 5,063,029 A | | 11/1991 | Mizuno et al. |
| 5,200,154 A | | 4/1993 | Harada et al. |

(Continued)

FOREIGN PATENT DOCUMENTS

| JP | 04-067588 A1 | 3/1992 |
| JP | 04-132662 A1 | 5/1992 |

(Continued)

OTHER PUBLICATIONS

U.S. Appl. No. 13/628,521, filed Sep. 27, 2012, Sakashita et al.

(Continued)

*Primary Examiner* — Amber Orlando
(74) *Attorney, Agent, or Firm* — Burr & Brown

(57) ABSTRACT

The honeycomb structure is provided with a honeycomb structural section, a pair of lateral electrodes on the side face of the honeycomb structural section, and at least one intermediate layer between the honeycomb structural section and the lateral electrodes. The honeycomb structural section has silicon carbide particles having an average particle diameter of 3 to 40 μm and silicon, and the ratio (Si/SiC) of silicon (Si) to silicon carbide (SiC) is 10/90 to 40/60. The lateral electrodes have an average particle diameter of the silicon carbide particles of 10 to 70 μm and a Si/SiC ratio of 20/80 to 50/50. The intermediate layer has an average particle diameter of silicon carbide particles and Si/SiC between those of the honeycomb structural section and those of the lateral electrodes. The electric resistance between the lateral electrodes of the honeycomb structural section is 2 to 100Ω.

16 Claims, 4 Drawing Sheets

(56) References Cited

U.S. PATENT DOCUMENTS

| | | | |
|---|---|---|---|
| 5,259,190 A * | 11/1993 | Bagley et al. | 60/300 |
| 5,266,278 A | 11/1993 | Harada et al. | |
| 5,288,975 A | 2/1994 | Kondo | |
| 5,423,904 A * | 6/1995 | Dasgupta | 96/146 |
| 5,733,352 A * | 3/1998 | Ogawa et al. | 55/523 |
| 7,011,803 B2 | 3/2006 | Ichikawa et al. | |
| 7,469,532 B2 * | 12/2008 | Williamson et al. | 60/295 |
| 7,686,857 B2 * | 3/2010 | Gonze et al. | 55/282.3 |
| 2003/0134084 A1 | 7/2003 | Ichikawa et al. | |
| 2012/0183725 A1 | 7/2012 | Noguchi et al. | 791/582 |
| 2012/0187109 A1 | 7/2012 | Noguchi et al. | 791/586 |

FOREIGN PATENT DOCUMENTS

| | | |
|---|---|---|
| JP | 2931362 B2 | 8/1999 |
| JP | 2004-315302 A1 | 11/2004 |
| JP | 4136319 B2 | 8/2008 |
| WO | 2008/096852 A1 | 8/2008 |

OTHER PUBLICATIONS

U.S. Appl. No. 13/628,672, filed Sep. 27, 2012, Sakashita et al.
U.S. Appl. No. 13/628,740, filed Sep. 27, 2012, Sakashita et al.
International Search Report and Written Opinion dated May 24, 2011.

* cited by examiner

HONEYCOMB STRUCTURE

BACKGROUND OF THE INVENTION

1. Field of the Invention

The present invention relates to a honeycomb structure and, more specifically, to a honeycomb structure functioning not only as a catalyst carrier but also as a heater.

2. Description of Related Art

There has conventionally been used a cordierite honeycomb structure having a catalyst loaded thereon for treating harmful substances in exhaust gas discharged from an automobile engine. In addition, there is known the use of a honeycomb structure formed of a silicon carbide sintered body for purification of exhaust gas (see, e.g., Patent Document 1).

In the case of treating exhaust gas by a catalyst loaded on a honeycomb structure, it is necessary to raise the temperature of the catalyst up to predetermined temperature. However, since the catalyst has low temperature at the time of engine start-up, there is a problem of insufficient purification of exhaust gas.

Therefore, there is investigated a method of raising temperature of exhaust gas by setting a metal heater on the upstream side of the honeycomb structure having a catalyst loaded thereon (see, e.g., Patent Document 2).

PRIOR ART DOCUMENT

Patent Document

Patent Document 1: Japanese Patent No. 4136319
Patent Document 2: Japanese Patent No. 2931362

When the heater as described above is mounted on an automobile and used, the power source used for the electrical system of the automobile is shared, and a power source having a high voltage of, for example, 600V is used. However, since a metal heater has a low electric resistance, there is a problem of damaging a power source circuit due to extreme flow of an electric current in the case of using a power source having a high voltage of 600V.

In addition, when the heater is made of metal, since it is difficult to load a catalyst even if the heater is machined to have a honeycomb structure, it is difficult to unitarily join the heater and the catalyst.

Therefore, there has been desired a porous carrier where a catalyst can easily be loaded and which can electrically generate heat. In order to function as a carrier for an exhaust gas purification catalyst, a carrier having a partition wall thickness of 300 μm and a cell density of 45 cells/cm² like a DPF is insufficient, and a catalyst having thinner partition walls and a higher cell density is required.

The present invention has been made in view of the aforementioned problems and aims to provide a honeycomb structure having an electrode portion which can easily be formed and functioning not only as a catalyst carrier, but also as a heater.

SUMMARY OF THE INVENTION

In order to solve the aforementioned problems, according to the present invention, there is provided the following honeycomb structure.

[1] A honeycomb structure comprising:
a cylindrical honeycomb structural section having porous partition walls separating and forming a plurality of cells functioning as fluid passages and extending over from one end face to the other end face and an outer peripheral wall located in the outermost periphery, a pair of lateral electrodes disposed on a side face of the honeycomb structural section, and at least one intermediate layer between the honeycomb structural section and the lateral electrodes; wherein the honeycomb structural section contains silicon carbide particles as a framework material and silicon as a bonding material for bonding the silicon carbide particles together, the silicon carbide particles as the framework material for the honeycomb structural section has an average particle diameter of 3 to 40 μm, and the ratio (Si/SiC) of silicon (Si) to silicon carbide (SiC) is 10/90 to 40/60, the lateral electrodes have an average particle diameter of the silicon carbide particles of 10 to 70 μm, and the ratio (Si/SiC) of silicon (Si) to silicon carbide (SiC) is 20/80 to 50/50, the intermediate layer has an average particle diameter of the silicon carbide particles between that of the honeycomb structural section and that of the lateral electrodes and a ratio of silicon (Si) to silicon carbide (SiC) between that of the honeycomb structural section and that of the lateral electrodes, and an electric resistance between the lateral electrodes is 2 to 100Ω.

[2] The honeycomb structure according to [1], wherein the honeycomb structural section has a porosity of 30 to 60%, an average pore size of 2 to 20 μm, a partition wall thickness of 50 to 200 μm, and a cell density of 50 to 150 cells/cm².

[3] The honeycomb structure according to [1] or [2], wherein the lateral electrode and/or the intermediate layer contain(s) at least one of aluminum, molybdenum, tin, and zirconium.

[4] The honeycomb structure according to any one of [1] to [3], wherein a surface layer having the same composition as the intermediate layer is provided on a surface of the lateral electrode.

By providing an intermediate layer, adhesion between the honeycomb structural section (substrate) and the electrode portion increases to inhibit exfoliation upon production, and the electric resistance of the interface between the honeycomb structural section and the electrode portion decreases to be able to suppress heat generation right under the electrode portion. By adding aluminum, molybdenum, tin, or zirconium to silicon (Si), the electric resistance of the electrode portion can be reduced. In addition, in the case of performing the second firing after disposing the electrode after firing the substrate, the firing temperature for the second firing can be lowered.

DETAILED DESCRIPTION OF THE INVENTION

Figure 1:
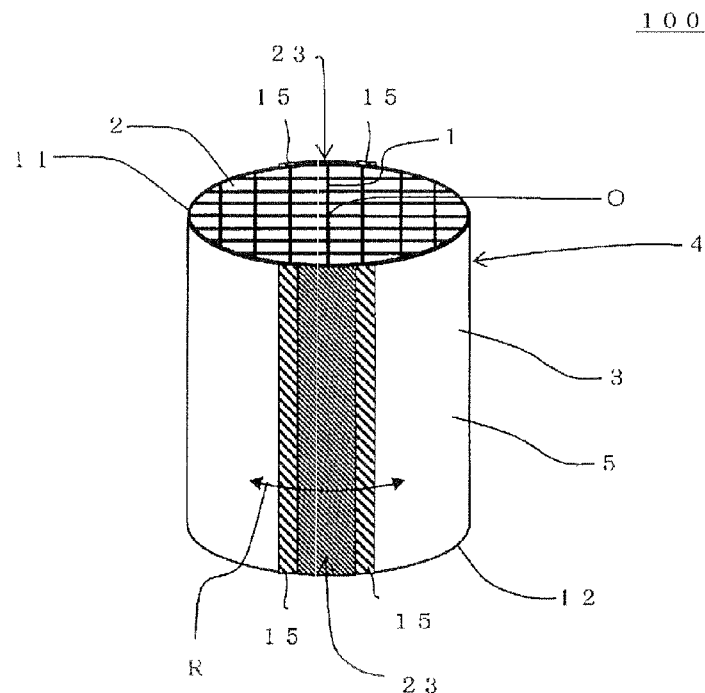
FIG. 1 is a perspective view schematically showing one embodiment of a honeycomb structure of the present invention.

Hereinbelow, embodiments of the present invention will be described with referring to drawings. The present invention is by no means limited to the following embodiments, and changes, modifications, and improvements may be added as long as they do not deviate from the scope of the invention.

(1) Honeycomb Structure:

As shown in FIGS. 1 to 3 and 6, an embodiment of a honeycomb structure of the present invention is provided with a cylindrical honeycomb structural section (substrate) 4 having porous partition walls 1 separating and forming a plurality of cells 2 functioning as fluid passages and extending over from one end face 11 to the other end face 12 and an outer peripheral wall 3 located in the outermost periphery (disposed so as to surround the outer periphery of the entire partition walls 1), a pair of lateral electrodes 23, 23 disposed on a side face of the honeycomb structural section 4, and at least one intermediate layer 15 between the honeycomb structural section 4 and the lateral electrodes 23. The honeycomb structural section 4 contains silicon carbide particles (silicon carbide) as a framework material and silicon as a bonding material for bonding the silicon carbide particles together. The silicon carbide particles as the framework material have an average particle diameter of 3 to 40 µm, and the ratio (Si/SiC) of silicon (Si) to silicon carbide (SiC) is 10/90 to 40/60. The lateral electrodes 23 have an average particle diameter of the silicon carbide particles of 10 to 70 µm, and the ratio (Si/SiC) of silicon (Si) to silicon carbide (SiC) is 20/80 to 50/50. The intermediate layer 15 has an average particle diameter of the silicon carbide particles between that of the honeycomb structural section 4 and that of the lateral electrodes 23 and a ratio of silicon (Si) to silicon carbide (SiC) between that of the honeycomb structural section 4 and that of the lateral electrodes 23. An electric resistance between the lateral electrodes 23 and 23 is 2 to 100Ω.

Figure 2:
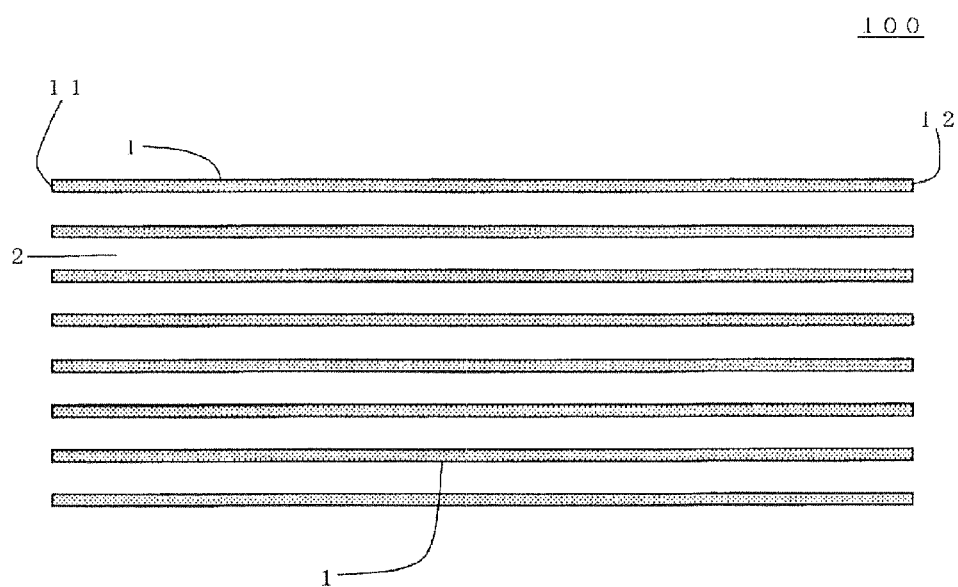
FIG. 2 is a perspective view showing a cross section parallel to the cell extension direction of an embodiment of a honeycomb structure of the present invention.
Figure 3:
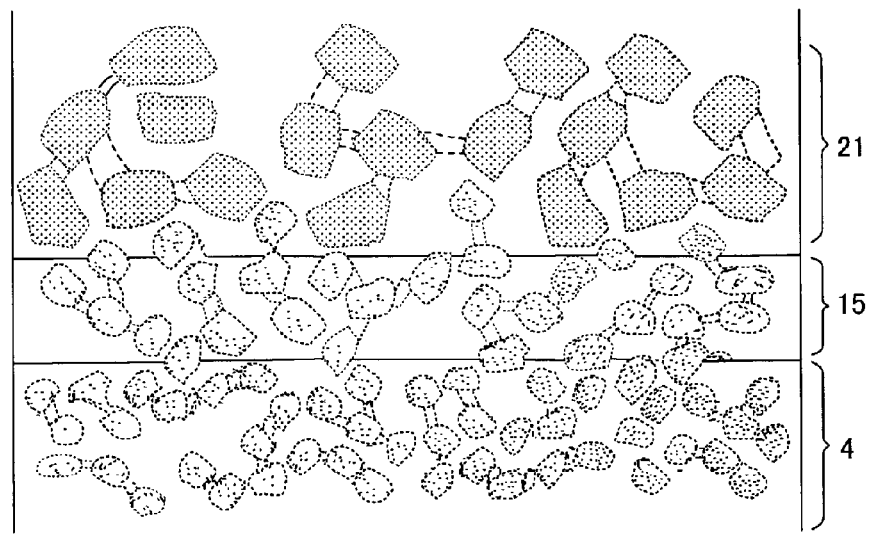
FIG. 3 is a schematic view schematically showing a cross section of a honeycomb structural section, an intermediate layer, and an electrode portion of a honeycomb structure of the present invention.

FIG. 1 is a perspective view schematically showing an embodiment of a honeycomb structure 100 of the present invention. FIG. 2 is a schematic view showing a cross section parallel to the cell extension direction of an embodiment of the honeycomb structure 100 of the present invention. Incidentally, FIG. 2 does not show any lateral electrode 23. FIG. 3 is a schematic view schematically showing a cross section of an electrode portion 21 of a honeycomb structural section 4, an intermediate layer 15, and a lateral electrode 23.

Thus, in the honeycomb structure 100 of the present embodiment, since the electric resistance between the lateral electrodes 23 and 23 is 2 to 100Ω, an electric current does not flow excessively even if en electric current is allowed to flow by the use of a power source having a high voltage, and therefore it can suitably be used as a heater.

In the honeycomb structure 100 of the present embodiment, the partition walls 1 and the outer peripheral wall 3 contains silicon carbide particles as a framework material and silicon as a bonding material for bonding the silicon carbide particles together. In the honeycomb structure 100 of the present embodiment, a plurality of silicon carbide particles are bonded together by silicon so as to form pores among the silicon carbide particles.

The honeycomb structure 100 of the present embodiment is provided with a pair of lateral electrodes 23 disposed on a side face of the honeycomb structural section 4. The lateral electrode 23 is constituted of an electrode portion 21 and an electrode terminal protrusion 22 (There is a case that the lateral electrode 23 has only the electrode portion 21 without the electrode terminal protrusion 22). The honeycomb structure 100 of the present embodiment generates heat by applying a voltage between the pair of electrode portions 21 and 21. The voltage to be applied is preferably 50 to 800V, more preferably 500 to 700V. For example, in the case of using a power source having a voltage of 600V for an automobile electrical system, it is preferable to apply the voltage of 600V.

The honeycomb structure 100 of the present embodiment has a partition wall thickness of 50 to 200 µm, preferably 70 to 130 µm. The partition wall thickness within such a range enables to suppress excessive increase of pressure loss upon allowing exhaust gas to flow even if a catalyst is loaded while using the honeycomb structure 100 as a catalyst carrier. When the partition wall thickness is smaller than 50 µm, it is not preferable because the strength of the honeycomb structure is low. When the partition wall thickness is larger than 200 µm, it is not preferable because of the large pressure loss upon allowing exhaust gas to flow in the case of loading a catalyst while using the honeycomb structure 100 as a catalyst carrier.

The honeycomb structure 100 of the present embodiment has a cell density of 50 to 150 cells/cm$^2$, preferably 70 to 100 cells/cm$^2$. The cell density within such a range enables to improve purification performance of the catalyst in a state where the pressure loss upon allowing exhaust gas to flow is made small. The cell density below 50 cells/cm$^2$ is not preferable because the catalyst load area is small. The cell density above 150 cells/cm$^2$ is not preferable because the pressure loss upon allowing exhaust gas to flow is large in the case of loading a catalyst while using the honeycomb structure 100 as the catalyst carrier.

In the honeycomb structure 100 of the present embodiment, the average particle diameter of the silicon carbide particles (framework material) constituting the honeycomb structural section 4 is 3 to 40 µm, preferable 10 to 35 µm. The average particle diameter of the silicon carbide particles constituting the honeycomb structural section 4 in such a range enables the volume electric resistance at 400° C. of a material for a honeycomb structure 100 to be 5 to 200 Ωcm. When the average particle diameter of the silicon carbide particles is below 3 µm, the volume electric resistance at 400° C. of the honeycomb structure 100 becomes large, which is not preferable. When the average particle diameter of the silicon carbide particles is above 40 µm, the volume electric resistance at 400° C. of the honeycomb structure 100 becomes small, which is not preferable. In addition, when the average particle diameter of the silicon carbide particles is above 40 µm, upon extrusion of a honeycomb formed body, a die for extrusion may be clogged with the forming raw material, which is not preferable. The average particle diameter of the silicon carbide particles is a value measured by a laser diffraction method.

The ratio (Si/SiC) of silicon (Si) to silicon carbide (SiC) constituting the honeycomb structural section 4 is preferably 10/90 to 40/60. It is more preferably 15/85 to 35/65. The ratio of silicon to silicon carbide particles contained in the honeycomb structural section 4 within such a range enables to obtain an appropriate volume electric resistance.

In the honeycomb structure 100 of the present embodiment, the volume electric resistance at 400° C. of a material for the honeycomb structural section 4 is 1 to 40 Ωcm, preferably 10 to 35 Ωcm. When the volume electric resistance at 400° C. is below 1 Ωcm, it is not preferable because the electric current flows excessively when the honeycomb structure 100 is electrified by a power source of 600V (the voltage is not limited to 600V). When the volume electric resistance at 400° C. is above 40 Ωcm, it is not preferable because the electric current hardly flows to sometimes cause insufficient heat generation when the honeycomb structure 100 is electrified by a power source of 600V (the voltage is not limited to 600V). The volume electric resistance at 400° C. of the honeycomb structure is a value measured by a four-terminal method.

In the honeycomb structure 100 of the present embodiment, the electric resistance (electric resistance between the lateral electrodes 23 and 23) at 400° C. of the honeycomb structure 100 is preferably 1 to 30Ω, furthermore preferably 10 to 25Ω. When the electric resistance at 400° C. is smaller than 1Ω, it is not preferable because the electric current flows excessively when the honeycomb structure 100 is electrified by a power source of, for example, 600V (the voltage is not limited to 600V). When an electric resistance at 400° C. is larger than 30Ω, it is not preferable because the electric current hardly flows when the honeycomb structure 100 is electrified by a power source of, for example, 600V (the voltage is not limited to 600V). The electric resistance at 400° C. of the honeycomb structure is a value measured by a four-terminal method.

In the honeycomb structure 100 of the present embodiment, the volume electric resistance at 400° C. of the electrode portion 21 is lower than the volume electric resistance at 400° C. of the honeycomb structural section 4, the volume electric resistance at 400° C. of the electrode portion 21 is 40% or less of the volume electric resistance at 400° C. of the honeycomb structural section 4, and it is preferably 25 to 35%. By specifying the volume electric resistance at 400° C. of electrode portion 21 to 40% or less of the volume electric resistance at 400° C. of the honeycomb structural section 4, the electrode portion 21 more effectively functions as an electrode.

The porosity of the partition walls 1 of the honeycomb structural section 4 is preferably 30 to 60%, more preferably 35 to 45%. The porosity of below 30% is not preferable because deformation upon firing becomes large. The porosity of above 60% is not preferable because the strength of the honeycomb structure becomes low. The porosity is a value measured with a mercury porosimeter.

The average pore size of the partition walls 1 of the honeycomb structural section 4 is preferably 2 to 20 μm, more preferably 10 to 20 μm. When the average pore size is smaller than 2 μm, the volume electric resistance becomes too large, which is not preferable. When the average pore size is larger than 20 μm, the volume electric resistance becomes too small, which is not preferable. The average pore size is measured by a mercury porosimeter.

In the honeycomb structure 100 of the present embodiment, the partition walls 1 and the outer peripheral wall 3 preferably contain silicon carbide particles as a framework material and silicon as a bonding material for bonding the silicon carbide particles together as the main components and may be formed of only silicon carbide and silicon. Even in the case that the partition walls 1 and the outer peripheral wall 3 are formed of only silicon carbide and silicon, a slight amount of 10 mass % or less of impurities may be contained. In the case that the partition walls 1 and the outer peripheral wall 3 contain substances (a slight amount of impurities) besides "silicon carbide and silicon", silicon oxide and the like can be mentioned as other substances contained in the partition walls 1 and the outer peripheral wall 3. Here, "the partition walls 1 and the outer peripheral wall 3 contain silicon carbide particles and silicon as the main components" means that the partition walls 1 and the outer peripheral wall 3 contain silicon carbide particles and silicon at 90 mass % or more of the entire components.

As shown in FIG. 1, it is preferable that each of a pair of intermediate layers 15, 15 extends in the cell 2 extension direction of the honeycomb structural section 4 and is formed into a "strip shape" extensively between both the end portions (between both the end faces 11 and 12). In a cross section perpendicular to the cell 2 extension direction, it is preferable that one intermediate layer 15 of the pair of intermediate layers 15, 15 is disposed on the opposite side across the central portion O of the honeycomb structural section 4 from the other intermediate layer 15. Since the intermediate layer 15 is formed into a strip shape extensively between both the end portions (between both the end faces 11, 12) of a honeycomb structural section 4 in such a manner that the longitudinal direction of the strip-shaped intermediate layer 15 extends in the cell 2 extension direction of the honeycomb structural section 4, the entire honeycomb structural section 4 can be heated more uniformly by forming a lateral electrode 23 on the intermediate layer 15. In addition, by disposing one intermediate layer 15 of the pair of intermediate layers 15, 15 on the opposite side across the central portion O of the honeycomb structural section 4 from the other intermediate layer 15 in a cross section perpendicular to the cell 2 extension direction, the entire honeycomb structural section 4 can be heated more uniformly.

The length (width) of the intermediate layer 15 in the "peripheral direction R of the honeycomb structural section 4" is preferably 1/30 to 1/3, more preferably 1/10 to 1/4, of the length in the peripheral direction R (outer peripheral length) of the side face 5 of the honeycomb structural section 4. Such a range enables to heat the entire honeycomb structural section 4 more uniformly. When the length (width) of the intermediate layer 15 in the peripheral direction R of the honeycomb structural section 4 is smaller than 1/30 of the length in the peripheral direction R of the side face 5 of the honeycomb structural section 4, it may become impossible to uniformly generate heat. When it is larger than 1/3, heating of the vicinity of the central portion of the honeycomb structural section 4 may become difficult.

The thickness of the intermediate layer 15 is preferably 0.05 to 2.0 mm, more preferably 0.1 to 0.5 mm. Such a range enables to generate heat uniformly. When the thickness of the intermediate layer 15 is smaller than 0.05 mm, bonding becomes insufficient to have high interface electric resistance, which may make uniform heat generation impossible. When it is larger than 2.0 mm, breakage may be caused upon canning.

Figure 4A:
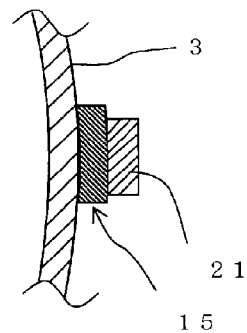
FIG. 4A is a schematic view showing a state where an electrode portion is disposed on an intermediate layer in a cross section perpendicular to the cell extension direction of an embodiment of a honeycomb structure of the present invention.
Figure 4B:
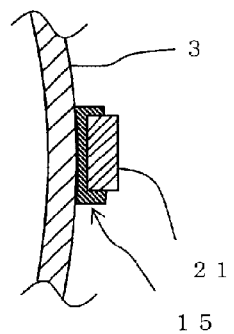
FIG. 4B is a schematic view showing a state where an electrode portion is disposed in an intermediate layer in a cross section perpendicular to the cell extension direction of another embodiment of a honeycomb structure of the present invention.

As shown in FIGS. 4A and 4B, it is preferable that the intermediate layer 15 is disposed on the surface of the outer peripheral wall 3. FIGS. 4A and 4B are schematic views showing a state where the intermediate layer 15 is disposed on the outer peripheral wall 3 in a cross section perpendicular to the cell extension direction of an embodiment of a honeycomb structure.

It is preferable that the intermediate layer 15 contains silicon carbide particles and silicon as the main components. Here, "contains silicon carbide particles and silicon as the main components" means that the total mass of silicon carbide particles and silicon is 90 mass % or more of the mass of the entire intermediate layer. Since the components of the intermediate layer 15 and the components of the honeycomb structural section 4 become the same (or close) by the intermediate layer 15 containing silicon carbide particles and silicon as the main components, the thermal expansion coefficient of the intermediate layer 15 becomes the same as (or close to) that of the honeycomb structural section 4. In addition, since the material is the same (or close), the bonding strength between the intermediate layer 15 and the honeycomb structural section 4 becomes high. Therefore, even if thermal stress is applied to the honeycomb structure, peeling of the intermediate layer 15 from the honeycomb structural section 4 and breakage of the bonding portion between the intermediate layer 15 and the honeycomb structural section 4 can be inhibited.

In the case that the main components of the intermediate layer 15 are silicon carbide particles and silicon, the average particle diameter of the silicon carbide particles contained in the intermediate layer 15 is between that of the honeycomb structural section and that of the lateral electrode. Specifically, 3 to 70 μm is preferable, and 15 to 50 μm is more preferable. The average particle diameter of the silicon carbide particles contained in the intermediate layer 15 within such a range enables to lower the electric resistance at the interface between the honeycomb structural section 4 and the lateral electrode 23. When the average pore size of the silicon carbide particles contained in the intermediate layer 15 is smaller than 3 μm, the volume electric resistance at 400° C. of the intermediate layer 15 may become too large. When the average pore size of the silicon carbide particles contained in the intermediate layer 15 is larger than 70 μm, the strength of the intermediate layer 15 is low, and breakage may be caused. The average particle diameter of the silicon carbide particles contained in the intermediate layer 15 is a value measured by a laser diffraction method.

The ratio of silicon (Si) to silicon carbide (SiC) contained in the intermediate layer 15 is between that of the honeycomb structural section 4 and that of the lateral electrode 23. Specifically, the ratio (Si/SiC) of silicon (Si) to silicon carbide (SiC) is preferably 10/90 to 50/50, more preferably 30/70 to 40/60. The ratio of silicon to silicon carbide particles contained in the intermediate layer 15 within such a range enables to obtain an appropriate volume electric resistance. When the ratio of silicon to silicon carbide particles contained in the intermediate layer 15 is smaller than 10/90, the volume electric resistance may become too large. When it is larger than 50/50, deformation may be caused easily upon production.

As shown in FIG. 1, it is preferable that each of the pair of electrode portions 21, 21 extends in the cell 2 extension direction of the honeycomb structural section 4 and is formed into a "strip shape" extensively between both the end portions (between both the end faces 11 and 12). In addition, it is preferable that one electrode portion 21 of the pair of electrode portions 21, 21 is disposed on the opposite side across the central portion O of the honeycomb structural section 4 from the other electrode portion 21 in a cross section perpendicular to the cell 2 extension direction. Since the electrode portion 21 is formed into a strip shape extensively between both the end portions (between both the end faces 11 and 12) of the honeycomb structural section 4 so that the longitudinal direction of the strip-shaped electrode portion 21 may extend in the cell 2 extension direction of the honeycomb structural section 4 in such a manner, the entire honeycomb structural section 4 can be heated more uniformly. In addition, since one electrode portion 21 of the pair of electrode portions 21, 21 is disposed on the opposite side across the central portion O of the honeycomb structural section 4 from the other electrode portion 21 in a cross section perpendicular to the cell 2 extension direction, the entire honeycomb structural section 4 can be heated more uniformly.

Figure 8:
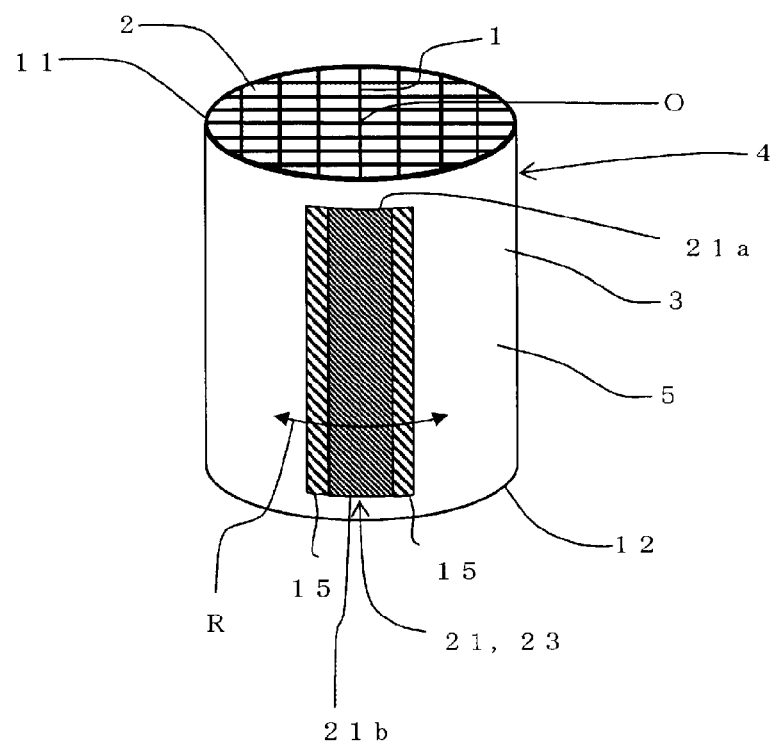
FIG. 8 is a perspective view schematically showing another embodiment of a honeycomb structure of the present invention.

As shown in FIG. 1, the electrode portions 21 may be disposed on the honeycomb structural section 4 so as to extend over between both the end portions (between both the end faces 11 and 12) of the honeycomb structural section 4. However, as shown in FIG. 8, there may have a gap between the end portions 21a, 21b "in the cell 2 extension direction" of the electrode portion 21 and the end portions (one end face 11, the other end face 12) of the honeycomb structural section 4. In the case of having a gap between the end portions 21a, 21b "in the cell 2 extension direction" of the electrode portion 21 and the end portions (one end face 11, the other end face 12) of the honeycomb structural section 4, the length "in the cell 2 extension direction" of the electrode portion 21 is preferably 50% or more, more preferably 80% or more, particularly preferably 90% or more, of the length "in the cell extension direction" of the honeycomb structure. FIG. 8 is a perspective view schematically showing another embodiment (honeycomb structure 300) of a honeycomb structure of the present invention.

The length (width) of the electrode portion 21 in the "peripheral direction R of the honeycomb structural section 4" is preferably $1/30$ to $1/3$, more preferably $1/10$ to $1/4$, of the length in the peripheral direction R (outer peripheral length) of the side face 5 of the honeycomb structural section 4. Such a range enables to heat the entire honeycomb structural section 4 more uniformly. When the length (width) of the electrode portion 21 in the peripheral direction R of the honeycomb structural section 4 is smaller than $1/30$ of the length in the peripheral direction R of the side face 5 of the honeycomb structural section 4, heat may not be generated uniformly. When it is larger than $1/3$, heating of the vicinity of the central portion of the honeycomb structural section 4 may be difficult.

The thickness of the electrode portion 21 is preferably 0.05 to 2.0 mm. Such a range enables to generate heat uniformly. When the thickness of the electrode portion 21 is smaller than 0.05 mm, the electric resistance becomes high, which may make uniform heat generation impossible. When it is larger than 2.0 mm, breakage may be caused upon canning.

As shown in FIG. 4A, it is preferable that the electrode portion 21 is disposed on the surface of the intermediate layer 15. In addition, as shown in FIG. 4B, also the electrode portion 21 in a state where a part (the side in contact with the intermediate layer 15) of the electrode portion 21 is embedded in the intermediate layer 15 while the other part (a part on the surface side) is exposed to the outside (on the surface side) from the intermediate layer 15 is a preferable mode. FIG. 4A is a schematic view showing a state where the electrode portion 21 is disposed on the intermediate layer 15 in a cross section perpendicular to the cell extension direction of an embodiment of a honeycomb structure of the present invention. FIG. 4B is a schematic view showing a state where the electrode portion 21 is disposed in the intermediate layer 15 in a cross section perpendicular to the cell extension direction of another embodiment of a honeycomb structure of the present invention. Incidentally, in FIGS. 4A to 4B, only a part of the outer peripheral wall 3, the intermediate layer 15, and one electrode portion 21 are shown, and partition walls and the like are not shown.

It is preferable that the electrode portion 21 contains silicon carbide particles and silicon as the main components. Here, the phase "silicon carbide particles and silicon as the main components" means that the total mass of silicon carbide particles and silicon is 90 mass % or more of the mass of the entire intermediate layer. Since the components of the electrode portion 21 and the components of the honeycomb structural section 4 become the same (or close) by the electrode portion 21 containing silicon carbide particles and silicon as the main components, the thermal expansion coefficient of the electrode portion 21 becomes the same as (or close to) that of the honeycomb structural section 4. In addition, since the material is the same (or close), the bonding strength between the detection portion 21 and the honeycomb structural section 4 becomes high. Therefore, even if thermal stress is applied on the honeycomb structure, peeling of the electrode portion 21 from the honeycomb structural section 4 and breakage of the bonding portion between the electrode portion 21 and the honeycomb structural section 4 can be inhibited.

The volume electric resistance at 400° C. of electrode portion 21 is preferably 0.1 to 10 Ωcm, more preferably 1 to 10 Ωcm. The volume electric resistance at 400° C. of electrode portion 21 within such a range enables the pair of electrode portions 21, 21 to effectively play a role of electrodes in the pipe where high-temperature exhaust gas flows. When the volume electric resistance at 400° C. of electrode portion 21 is smaller than 0.1 Ωcm, deformation may be caused upon production. When the volume electric resistance at 400° C. of electrode portion 21 is larger than 10 Ωcm, the flow of the electric current becomes hard, and therefore, it may become difficult for the electrode portion 21 to play a role as the electrode.

The electrode portion 21 has a porosity of preferably 30 to 60%, more preferably 45 to 55%. The electrode portion 21 having a porosity within such a range enables to obtain a preferable volume electric resistance. When the porosity of the electrode portion 21 is below 30%, deformation may be caused upon production. When the porosity of the electrode portion 21 is above 60%, the volume electric resistance may become too high. The porosity is a value measured with a mercury porosimeter.

The electrode portion 21 has an average pore size of preferably 5 to 45 μm, more preferably 20 to 40 μm. By the electrode portion 21 having an average pore size in such a range, an appropriate volume electric resistance can be obtained. When the average pore size of the electrode portion 21 is smaller than 5 μm, the volume electric resistance may become too high. When the average pore size of the electrode portion 21 is larger than 45 μm, the strength become low, and breakage may be caused. The average pore size is a value measured by a mercury porosimeter.

In the case that the main components of the electrode portion 21 are silicon carbide particles and silicon, the silicon carbide particles contained in electrode portion 21 has an average particle diameter of preferably 10 to 70 μm, more preferably 40 to 60 μm. By the silicon carbide particles contained in the electrode portion 21 being within such a range, the volume electric resistance at 400° C. of the electrode portion 21 can be controlled to 0.1 to 2.0 Ωcm. When the average pore size of the silicon carbide particles contained in the electrode portion 21 is smaller than 10 μm, the volume electric resistance at 400° C. of the electrode portion 21 may become too large. When the average pore size of the silicon carbide particles contained in the electrode portion 21 is larger than 70 μm, the strength of the electrode portion 21 becomes low, and breakage may be caused. The average particle diameter of the silicon carbide particles contained in the electrode portion 21 is a value measured by a laser diffraction method.

The ratio (Si/SiC) of silicon (Si) to silicon carbide (SiC) contained in the electrode portion 21 is 20/80 to 50/50, more preferably 20/80 to 40/60. The ratio of silicon to silicon carbide particles contained in the electrode portion 21 within such a range enables to obtain an appropriate volume electric resistance. When the ratio of silicon to silicon carbide particles contained in the electrode portion 21 is smaller than 20/80, the volume electric resistance may become too large. When it is larger than 50/50, deformation may be easily be caused upon production.

In the honeycomb structure of the present embodiment, it is preferable that, when a tangent line in contact with the outer periphery of the honeycomb structural section is drawn in the central portion of the electrode portion in the peripheral direction of the honeycomb structural section in a cross section perpendicular to the cell extension direction, the tangent line is parallel to any of the partition walls. This inhibits breakage upon canning.

The thickness of the outer peripheral wall 3 constituting the outermost periphery of the honeycomb structure 100 of the present embodiment is preferably 0.1 to 2 mm. When the thickness is smaller than 0.1 mm, the strength of the honeycomb structure 100 may become low. When it is larger than 2 mm, the area of the partition walls where a catalyst is loaded may become small.

In the honeycomb structure 100 of the present embodiment, the shape of the cell 2 in a cross section perpendicular to the cell 2 extension direction is a quadrangle or a hexagon. The cells having such a shape enables the pressure loss upon allowing exhaust gas to flow through the honeycomb structure 100 to become small and the purification performance of the catalyst to be excellent.

There is no particular limitation on the shape of the honeycomb structure of the present embodiment, and it may be, for example, a cylindrical shape having a circular bottom face (circular cylindrical shape), a cylindrical shape having an oval bottom face, a cylindrical shape having a polygonal (quadrangular, pentagonal, hexagonal, heptagonal, octagonal, etc.) bottom face, or the like. In addition, regarding the size of the honeycomb structure, the area of the bottom face is preferably 2000 to 20000 $mm^2$, more preferably 4000 to 10000 $mm^2$. In addition, the length in the central direction of the honeycomb structure is preferably 50 to 200 mm, more preferably 75 to 150 mm.

The isostatic strength of the honeycomb structure 100 of the present embodiment is preferably 1 MPa or more. When the isostatic strength is below 1 MPa, breakage may be caused when the honeycomb structure is used as a catalyst carrier or the like. The isostatic strength is measured by applying hydrostatic pressure in water.

Figure 5:
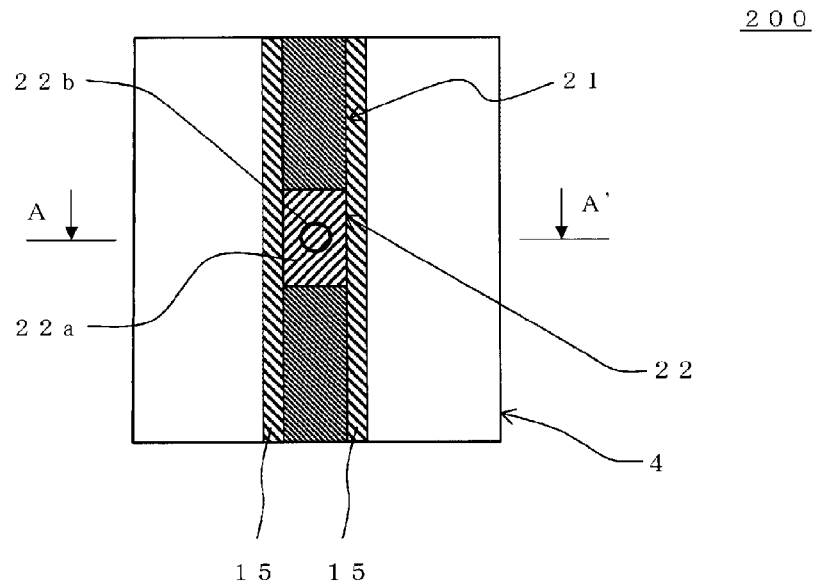
FIG. 5 is a lateral view schematically showing another embodiment of a honeycomb structure of the present invention.
Figure 6:
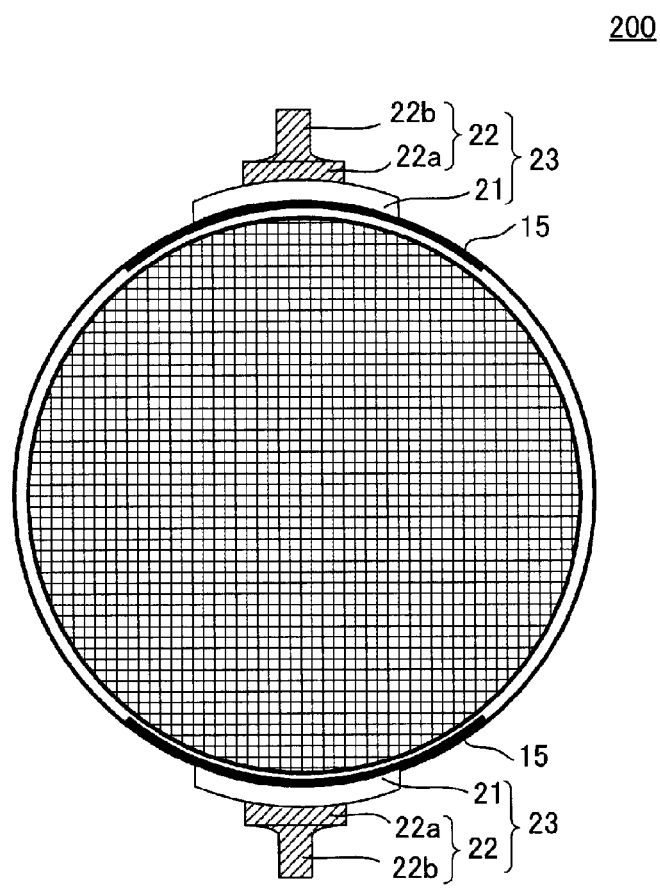
FIG. 6 is a schematic view showing the A-A' cross section of FIG. 5.

As shown in FIGS. 5 and 6, in another embodiment of the honeycomb structure of the present invention, each of the pair of electrodes 21, 21 is provided with an electrode terminal protrusion 22 for connecting electrical wire. The electrode portion 21 and the electrode terminal protrusion 22 are called as the lateral electrode 23 (However, only the electrode portions 21 may be formed without forming the electrode terminal protrusions 22 on the honeycomb structure 100 of the present invention. In that case, only the electrode portions 21 serve as lateral electrodes 23). The volume electric resistance at 400° C. of the electrode terminal protrusions 22 is preferably 40% or less, more preferably 25 to 35% of the volume electrode resistance at 400° C. of the honeycomb structural section 4. Thus, since an electrode terminal protrusion 22 for connecting electrical wire to each of the pair of electrode portions 21, 21, electrical wire from a power source present outside can be connected to a honeycomb structure 200 without damaging the honeycomb structural section 4. When the volume electric resistance at 400° C. of the electrode terminal protrusions 22 is larger than 40% of the volume electric resistance at 400° C. of the honeycomb structural section 4, the electricity hardly passes through the electrode terminal protrusion 22, which may make the heating of honeycomb structural section 4 difficult. FIG. 5 is a lateral view schematically showing another embodiment of a honeycomb structure of the present invention. FIG. 6 is a schematic view showing the A-A' cross section of FIG. 5.

When the main components of the electrode portions 21 are silicon carbide particles and silicon, it is preferable that the main components of the electrode terminal protrusions 22 are also silicon carbide particles and silicon. Thus, since the electrode terminal protrusions 22 containing silicon carbide particles and silicon as the main components make the components of the electrode portions 21 and those of the electrode terminal protrusions 22 the same (or close), the thermal expansion coefficient of the electrode terminal protrusions 22 becomes the same as (or close to) that of the electrode portions 21. In addition, since the material is the same (or close), the bonding strength between the electrode portion 21 and the electrode terminal protrusion 22 becomes high. Therefore, even if thermal stress is applied on the honeycomb structure, peeling of the electrode terminal protrusion 22 from the electrode portion 21 and breakage of the bonding portion between the electrode terminal protrusion 22 and the electrode portion 21 can be inhibited. Hereinbelow, "the electrode terminal protrusions 22 containing silicon carbide particles and silicon as the main components" means that the electrode terminal protrusions 22 contain silicon carbide particles and silicon at 90 mass % or more of the entire components.

The shape of the electrode terminal protrusions 22 is not particularly limited as long as the electrode terminal protrusions 22 can be connected to the electrode portions 21 and as long as electrical wire can be connected to the electrode terminal protrusions 22. For example, as shown in FIGS. 5 and 6, it is preferable that the electrode terminal protrusion 22 has a shape where a circular columnar protrusion 22b is disposed on a quadrangular plate-shaped substrate 22a. Such a shape enables the electrode terminal protrusion 22 to be connected firmly to the electrode portion 21 by the substrate 22a and enables the electrical wire to be connected securely by the protrusion 22b.

In the electrode terminal protrusion 22, the thickness of the substrate 22a is preferably 1 to 5 mm. Such a thickness enables to bond the electrode terminal protrusion 22 securely to the electrode portion 21. When it is smaller than 1 mm, the substrate 22a is week, and the protrusion 22b may easily be peeled off from the substrate 22a. When it is larger than 5 mm, the space for disposing a honeycomb structure may become larger than necessary.

In the electrode terminal protrusion 22, the length (width) in the "peripheral direction R of the honeycomb structural section 4" of the substrate 22a is preferably 20 to 100%, more preferably 30 to 100% of the length in the "peripheral direction R of the honeycomb structural section 4" of the electrode portion 21. Such a range inhibits the protrusion 22 from being easily detached from the electrode portion 21. When it is smaller than 20%, the electrode terminal protrusion 22 may easily be detached from the electrode portion 21. In the electrode terminal protrusion 22, the length in the "cell 2 extension direction" of the substrate 22a is preferably 5 to 30% of the length in the cell extension direction of the honeycomb structural section 4. By the length in the "cell 2 extension direction" of the substrate 22a in such a range, sufficient bonding strength can be obtained. When the length in the "cell 2 extension direction" of the substrate 22a is smaller than 5% of the length in the cell extension direction of the honeycomb structural section 4, the substrate 22a may easily be detached from the electrode portion 21. When it is larger than 30%, the mass may become large.

In the electrode terminal protrusion 22, the thickness of the protrusion 22b is preferably 3 to 15 mm. Such a thickness enables to bond electrical wire securely to the protrusion 22b. When it is smaller than 3 mm, the protrusion 22b may be broken easily. When it is larger than 15 mm, it may become difficult to connect the electrical wire. The length of the protrusion 22b is preferably 3 to 20 mm. By such a length, the electrical wire can securely be connected to the protrusion 22b. When it is smaller than 3 mm, it may become difficult to connect the electrical wire. When it is longer than 20 mm, the protrusion 22b may easily be broken.

As shown in FIG. 5, the electrode terminal protrusion 22 is preferably disposed in the central portion in the "cell 2 extension direction" of the electrode portion 21. This makes uniform heating of the entire honeycomb structural section 4 easy.

The volume electric resistance at 400° C. of the electrode terminal protrusion 22 is preferably 0.1 to 10 Ωcm, more preferably 0.5 to 5 Ωcm. The volume electric resistance at 400° C. of the electrode terminal protrusion 22 within such a range, an electric current can efficiently be supplied to the electrode portion 21 from the electrode terminal protrusion 22. When the volume electric resistance at 400° C. of the electrode terminal protrusion 22 is smaller than 0.1 Ωcm, the electric current hardly flows to make it difficult to supply the electric current to the electrode portion 21.

The electrode terminal protrusion 22 has a porosity of preferably 25 to 45%, more preferably 30 to 40%. The porosity of the electrode terminal protrusion 22 within such a range enables to obtain an appropriate volume electric resistance. When the porosity of the electrode terminal protrusion 22 is lower than 25%, deformation may be caused upon production. When the porosity of the electrode terminal protrusion 22 is higher than 45%, the strength of the electrode terminal protrusion 22 may become low, and, particularly when the strength of the protrusion 22 is low, the protrusion 22b may easily be broken. The porosity is a value measured by a mercury porosimeter.

The electrode terminal protrusion 22 has an average pore size of preferably 5 to 30 μm, more preferably 15 to 25 μm. The average pore size of the electrode terminal protrusion 22 within such a range enables to obtain an appropriate volume electric resistance. When the average pore size of the electrode terminal protrusion 22 is smaller than 5 μm, deformation may be caused upon production. When the average pore size of the electrode terminal protrusion 22 is larger than 30 μm, the electrode terminal protrusion 22 may have low strength. In particular, when the protrusion 22b has low strength, the protrusion 22b may easily be broken. The average pore size is a value measured with a mercury porosimeter.

In the case that the main components of the electrode terminal protrusion 22 are silicon carbide particles and silicon, the silicon carbide particles contained in the electrode terminal protrusion 22 has an average particle diameter of preferably 10 to 70 μm, more preferably 40 to 60 μm. The average particle diameter of the silicon carbide particles contained in the electrode terminal protrusion 22 within such a range enables the volume electric resistance at 400° C. of the electrode terminal protrusion 22 to be 0.1 to 2.0 Ωcm. When the average pore size of the silicon carbide particles contained in the electrode terminal protrusion 22 is smaller than 10 μm, the volume electric resistance at 400° C. of the electrode terminal protrusion 22 may become too large. When the average pore size of the silicon carbide particles contained in the electrode terminal protrusion 22 is larger than 70 μm, strength may become low. The average particle diameter of the silicon carbide particles contained in the electrode terminal protrusion 22 is measured by a laser diffraction method.

The ratio (Si/SiC) of silicon (Si) to silicon carbide (SiC) contained in the electrode terminal protrusion 22 is 20/80 to 50/50, more preferably 20/80 to 40/60. The ratio of silicon to silicon carbide particles contained in the electrode terminal protrusion 22 within such a range enables to obtain an appropriate volume electric resistance. When the ratio of silicon to silicon carbide particles contained in the electrode terminal protrusion 22 is smaller than 20/80, the volume electric resistance may become too large. When it is larger than 50/50, deformation may easily be caused upon production.

In addition, the electric resistance at 400° C. measured "between the electrode terminal protrusions disposed on the pair of electrodes 21, 21, respectively," of the honeycomb structure 200 of the present embodiment is preferably 1 to 30Ω, furthermore preferably 10 to 25Ω. When the electric resistance at 400° C. is smaller than 1Ω, it is not preferable because the electric current flows excessively when the honeycomb structure 100 is electrified by a power source of 600V. When an electric resistance at 400° C. is larger than 30Ω, it is not preferable because the electric current hardly flows when the honeycomb structure 100 is electrified by a power source of 600V. The electric resistance at 400° C. of the honeycomb structure is measured by a four-terminal method.

Figure 7:
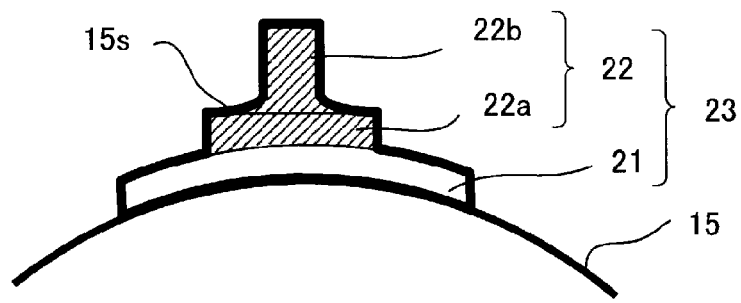
FIG. 7 is a schematic view showing a lateral electrode provided with a surface layer which is the same as the intermediate layer on the surface.

It is also preferable that a surface layer 15s having the same composition as the intermediate layer 15 is provided on the surface of the lateral electrode 23 as shown in FIG. 7 by applying slurry having the same composition as the intermediate layer 15 to the lateral electrode 23. This is preferable because the surface of the lateral electrode 23 becomes dense, the electric resistance can be reduced, and the strength can be improved.

(2) Method for Producing Honeycomb Structure

Next, a method for producing one embodiment of a honeycomb structure of the present invention will be described.

In the first place, to a silicon carbide powder (silicon carbide) are added metal silicon (metal silicon powder), a binder, a surfactant, a pore former, water, and the like to prepare a forming raw material. It is preferable to control mass of the metal silicon to 10 to 30 mass % with respect to the total mass of the silicon carbide powder and the metal silicon. The average particle diameter of the silicon carbide particles in the silicon carbide powder is preferably 3 to 40 μm, more preferably 10 to 35 μm. The average particle diameter of the metal silicon (metal silicon powder) is preferably 2 to 20 μm. When it is smaller than 2 μm, the volume electric resistance may become too large. When it is larger than 20 μm, deformation may be caused upon production. The average particle diameters of the silicon carbide particles and the metal silicon (metal silicon particles) are measured by a laser diffraction method. The silicon carbide particles are silicon carbide microparticles constituting the silicon carbide powder, and the metal silicon particles are metal silicon microparticles constituting the metal silicon powder. The total mass of the silicon carbide particles and the metal silicon is preferably 30 to 78 mass % with respect to the mass of the entire forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 2 to 10 mass % with respect to the entire forming raw material.

The water content is preferably 20 to 60 mass % with respect to the entire forming raw material.

As the surfactant, there can be used ethylene glycol, dextrin, fatty acid soap, polyalcohol, and the like. These may be used alone or in combination of two or more kinds. The surfactant content is preferably 2 mass % or less with respect to the entire forming raw material.

There is no particular limitation on the pore former as long as it forms pores after firing. Examples of the pore former include graphite, starch, resin balloon, water-absorbing resin, and silica gel. The pore former content is preferably 10 mass % or less with respect to the entire forming raw material. The average particle diameter of the pore former is preferably 10 to 30 μm. When it is smaller than 10 μm, pores may be formed insufficiently. When it is larger than 30 μm, the die may be clogged with the pore former upon forming. The average particle diameter of the pore former is measured by a laser diffraction method.

Next, the forming raw material is kneaded to obtain kneaded material. There is no particular limitation on the method for obtaining kneaded material by kneading the forming raw material, and, for example, a method using a kneader, a vacuum kneader, or the like may be employed.

Then, the kneaded material is subjected to extrusion to form a honeycomb formed body. Upon the extrusion, it is preferable to use a die having desired entire shape, cell shape, partition wall thickness, cell density, and the like. The material for the die is preferably a superhard alloy which hardly abrades away. The honeycomb formed body has a structure having porous partition walls separating and forming a plurality of cells functioning as fluid passages and the outer peripheral wall located in the outermost periphery.

The partition wall thickness, cell density, thickness of the outer peripheral wall, and the like of the honeycomb formed body can appropriately be determined according to the structure of a honeycomb structure to be produced of the present invention in consideration of shrinkage during drying and firing.

It is preferable to subject the honeycomb formed body obtained above to drying. There is no particular limitation on the method for drying, and examples of the method include a microwave heating method such as microwave heat-drying and a high-frequency dielectric heat-drying and an external heating method such as hot air drying and superheated steam drying. Of these, preferred is a method where, after a certain amount of water is dried by a microwave heating method, the remaining water is dried by an external heating method in that the entire formed body can be dried quickly and uniformly lest a crack should be caused. As the conditions for the drying, it is preferable that, after 30 to 99 mass % of water with respect to the water content before drying is removed by a microwave heating method, water content is controlled to be 3 mass % or less by an external heating method. The dielectric heat-drying is preferable as a microwave heating method, and hot air drying is preferable as an external heating method.

In the case that the length of the honeycomb formed body in the central axial direction is not a desired length, it is preferable to cut of both the end faces (both the end portions) to have a desired length. Though there is no particular limitation on the cutting method, a method using a rim saw cutter may be employed.

Next, an intermediate layer-forming raw material for forming an intermediate layer is prepared. In the case that the main components of the intermediate layer are silicon carbide and silicon, the intermediate layer-forming raw material is preferably prepared by adding predetermined additives to a silicon carbide powder and a silicon powder, followed by kneading.

Specifically, to the silicon carbide powder (silicon carbide) are added the metal silicon (metal silicon powder), binder, surfactant, pore former, water, and the like, and they are kneaded to prepare an intermediate layer-forming raw material. The mass of the metal silicon is preferably controlled to be 10 to 50 mass % with respect to the total mass of the silicon carbide powder and the metal silicon. The average particle diameter of the silicon carbide particles in the silicon carbide powder is preferably 3 to 70 µm. The average particle diameter of the metal silicon (metal silicon powder) is preferably 2 to 20 µm. When it is smaller than 2 µm, the volume electric resistance may become too large. When it is larger than 20 µm, deformation may be caused upon production. The average particle diameters of the silicon carbide particles and the metal silicon (metal silicon particles) are measured by a laser diffraction method. The silicon carbide particles are silicon carbide microparticles constituting the silicon carbide powder, and the metal silicon particles are metal silicon microparticles constituting the metal silicon powder. The total mass of the silicon carbide particles and the metal silicon is preferably 40 to 80 mass % with respect to the mass of the entire intermediate layer-forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 0.1 to 2 mass % with respect to the entire intermediate layer-forming raw material.

The water content is preferably 50 to 500 mass % with respect to the entire intermediate layer-forming raw material.

As the surfactant, there can be used ethylene glycol, dextrin, fatty acid soap, polyalcohol, and the like. These may be used alone or in combination of two or more kinds. The surfactant content is preferably 2 mass % or less with respect to the entire intermediate layer-forming raw material.

Next, the silicon carbide powder (silicon carbide), metal silicon (metal silicon powder), binder, surfactant, pore former, water, and the like are mixed, and the mixture are kneaded to prepare a slurried intermediate layer-forming raw material. There is no particular limitation on the method for kneading, and, for example, a vertical stirrer can be used.

Next, it is preferable that the intermediate layer-forming raw material obtained above is applied on the side face of the dried honeycomb formed body. Though there is no particular limitation on the method for applying an intermediate layer-forming raw material on the side face of the honeycomb formed body, for example, a spraying method or a printing method may be employed. It is preferable that the intermediate layer-forming raw material is applied on the side face of the honeycomb formed body to have a shape of the intermediate layer in the aforementioned honeycomb structure of the present invention. The intermediate layer can have a desired thickness by adjusting the thickness when the intermediate layer-forming raw material is applied. Since the intermediate layer can be thus formed only by applying the intermediate layer-forming raw material on the side face of the honeycomb formed body, drying, and firing; the intermediate layer can be formed very easily.

Next, it is preferable to dry the intermediate layer-forming raw material applied on the side face of the honeycomb formed body. A drying condition is preferably 50 to 100° C.

Then, an electrode portion-forming raw material for forming the electrode portion is prepared. In the case that the main components of the electrode portion are silicon carbide and silicon, the electrode portion-forming raw material is preferably prepared by adding predetermined additives to a silicon carbide powder and a silicon powder, followed by kneading.

Specifically, to the silicon carbide powder (silicon carbide) are added the metal silicon (metal silicon powder), binder, surfactant, pore former, water, and the like, and they are kneaded to prepare an electrode portion-forming raw material. The mass of the metal silicon is preferably controlled to be 20 to 40 mass % with respect to the total mass of the silicon carbide powder and the metal silicon. The average particle diameter of the silicon carbide particles in the silicon carbide powder is preferably 10 to 70 µm. The average particle diameter of the metal silicon (metal silicon powder) is preferably 2 to 20 µm. When it is smaller than 2 µm, the volume electric resistance may become too large. When it is larger than 20 µm, deformation may be caused upon production. The average particle diameters of the silicon carbide particles and the metal silicon (metal silicon particles) are measured by a laser diffraction method. The silicon carbide particles are silicon carbide microparticles constituting the silicon carbide powder, and the metal silicon particles are metal silicon microparticles constituting the metal silicon powder. The total mass of the silicon carbide particles and the metal silicon is preferably 40 to 80 mass % with respect to the mass of the entire electrode portion-forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 0.1 to 2 mass % with respect to the entire electrode portion-forming raw material.

The water content is preferably 19 to 55 mass % with respect to the entire electrode portion-forming raw material.

As the surfactant, there can be used ethylene glycol, dextrin, fatty acid soap, polyalcohol, and the like. These may be used alone or in combination of two or more kinds. The surfactant content is preferably 2 mass % or less with respect to the entire electrode portion-forming raw material.

Next, the silicon carbide powder (silicon carbide), metal silicon (metal silicon powder), binder, surfactant, pore former, water, and the like are mixed, and the mixture are kneaded to prepare a pasty electrode portion-forming raw material. There is no particular limitation on the method for kneading, and, for example, a vertical stirrer can be used.

Next, it is preferable that the electrode portion-forming raw material obtained above is applied on the side face of the dried honeycomb formed body. Though there is no particular limitation on the method for applying an electrode portion-forming raw material on the side face of the honeycomb formed body, for example, a printing method may be employed. It is preferable that the electrode portion-forming raw material is applied on the side face of the honeycomb formed body to have a shape of the electrode portion in the aforementioned honeycomb structure of the present invention. The electrode portion can have a desired thickness by adjusting the thickness when the electrode portion-forming raw material is applied. Since the electrode portion can be thus formed only by applying the electrode portion-forming raw material on the side face of the honeycomb formed body, drying, and firing; the electrode portion can be formed very easily.

Next, it is preferable to dry the electrode portion-forming raw material applied on the side face of the honeycomb formed body. A drying condition is preferably 50 to 100° C.

Next, it is preferable to produce an electrode terminal protrusion-forming member. The electrode terminal protrusion-forming member is bonded to the honeycomb formed body to function as the electrode terminal protrusion. Though there is no particular limitation on the shape of the electrode terminal protrusion-forming member, for example, it is preferable to have a shape as shown in FIGS. 5 to 6. It is preferable to bond the electrode terminal protrusion-forming member obtained above to a portion where the electrode portion-forming raw material is applied of the honeycomb formed body having the electrode portion-forming raw material applied thereto. The production of the honeycomb formed body, preparation of the electrode portion-forming raw material, and production of electrode terminal protrusion-forming member may be performed in any order.

The electrode terminal protrusion-forming member is preferably obtained by forming the electrode terminal protrusion-forming raw material (raw material for forming the electrode terminal protrusion-forming member) and drying it. In the case that the main components of the electrode terminal protrusion are silicon carbide and silicon, the electrode terminal protrusion-forming raw material is preferably prepared by adding predetermined additives to a silicon carbide powder and a silicon powder, followed by kneading.

Specifically, to the silicon carbide powder (silicon carbide) are added the metal silicon (metal silicon powder), binder, surfactant, pore former, water, and the like, and they are kneaded to prepare an electrode terminal protrusion-forming raw material. The mass of the metal silicon is preferably controlled to be 20 to 40 mass % with respect to the total mass of the silicon carbide powder and the metal silicon. The average particle diameter of the silicon carbide particles in the silicon carbide powder is preferably 10 to 70 μm. The average particle diameter of the metal silicon (metal silicon powder) is preferably 2 to 20 μm. When it is smaller than 2 μm, the volume electric resistance may become too large. When it is larger than 20 μm, deformation may be caused upon production. The average particle diameters of the silicon carbide particles and the metal silicon (metal silicon particles) are measured by a laser diffraction method. The silicon carbide particles are silicon carbide microparticles constituting the silicon carbide powder, and the metal silicon particles are metal silicon microparticles constituting the metal silicon powder. The total mass of the silicon carbide particles and the metal silicon is preferably 50 to 85 mass % with respect to the mass of the entire electrode terminal protrusion-forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 1 to 10 mass % with respect to the entire electrode terminal protrusion-forming raw material.

The water content is preferably 15 to 30 mass % with respect to the entire electrode terminal protrusion-forming raw material.

As the surfactant, there can be used ethylene glycol, dextrin, fatty acid soap, polyalcohol, and the like. These may be used alone or in combination of two or more kinds. The surfactant content is preferably 2 mass % or less with respect to the entire electrode terminal protrusion-forming raw material.

Next, the silicon carbide powder (silicon carbide), metal silicon (metal silicon powder), binder, surfactant, pore former, water, and the like are mixed, and the mixture is kneaded to prepare an electrode terminal protrusion-forming raw material. There is no particular limitation on the method for kneading, and, for example, a kneader can be used.

There is no particular limitation on the method for obtaining the shape of the electrode terminal protrusion-forming member by forming the electrode terminal protrusion-forming raw material obtained above, and a method where machining is performed after extrusion can be employed.

It is preferable that, after the electrode terminal protrusion-forming raw material is formed into the shape of the electrode terminal protrusion-forming member, drying is performed to obtain the electrode terminal protrusion-forming member. A drying condition is preferably 50 to 100° C.

Next, it is preferable that the electrode terminal protrusion-forming member is bonded to the honeycomb formed body where the electrode portion-forming raw material has been applied. Though there is no particular limitation on the method for bonding the electrode terminal protrusion-forming member to the honeycomb formed body (portion where the electrode portion-forming raw material has been applied of the honeycomb formed body), it is preferable that the electrode terminal protrusion-forming member is bonded to the honeycomb formed body by the use of the aforementioned electrode portion-forming raw material. For example, it is preferable that the electrode portion-forming raw material is applied to the "face to be bonded to the honeycomb formed body (face to be brought into contact with the honeycomb formed body)" of the electrode terminal protrusion-forming member to bond the electrode terminal protrusion-forming member to the honeycomb formed body in such a manner that the "face where the electrode portion-forming raw material has been applied" is brought into contact with the honeycomb formed body.

It is preferable that the honeycomb formed body where the electrode portion-forming raw material has been applied and where the electrode terminal protrusion-forming member has been bonded is dried and fired to obtain a honeycomb structure of the present invention.

A drying condition at this time is preferably 50 to 100° C.

It is preferable to perform calcination before firing in order to remove the binder and the like. The calcination is preferably performed at 400 to 500° C. for 0.5 to 20 hours in the ambient atmosphere. There is no particular limitation on the methods of calcination and firing, and firing can be performed by the use of an electric furnace, a gas furnace, and the like. As the firing conditions, heating is preferably performed at 1400 to 1500° C. for 1 to 20 hours in an inert atmosphere of nitrogen, argon, or the like. It is preferable to perform an oxygenation treatment at 1200 to 1350° C. for 1 to 10 hours after firing in order to improve durability.

The electrode terminal protrusion-forming member may be bonded before or after the honeycomb formed body is fired. In the case that the electrode terminal protrusion-forming member is bonded after the honeycomb formed body is fired, it is preferable to fire again under the aforementioned conditions after that.

EXAMPLE

Hereinbelow, the present invention will be described in more detail on the basis of Examples. However, the present invention is by no means limited to these Examples.

Examples 1 to 16

Honeycomb Structural Section

With respect to 100 mass % of the sum of the Si raw material and the SiC raw material shown in Table 1, there were mixed and kneaded 1 mass % of a water-absorbing resin, 7 mass % of hydroxypropylmethyl cellulose, and 35 mass % of water to obtain a kneaded material. A kneaded material for forming was obtained with a vacuum kneader, and it was formed with an extruder, followed by drying and cutting both the end faces to obtain a dried body. After the dried body was degreased at 550° C. for 3 hours, it was fired at 1450° C. for two hours in argon. The honeycomb structural section 4 obtained had a diameter of 93 mm and a length of 100 mm, and the porosity, pore size (average pore size), volume electric resistance, rib thickness (partition wall thickness), and number of cells (cell density) were as shown in Table 1.

(Intermediate Layer)

With respect to 100 mass % of the sum of the Si raw material and the SiC raw material shown in Table 1, there were mixed 0.4 mass % of hydroxypropylmethyl cellulose and 300 mass % of water with a vertical mixer to obtain slurry. The slurry was sprayed onto two opposite positions on the side face of the fired honeycomb structural section 4 firing to have a width of 75 mm and a thickness of 0.1 mm and then dried at 70° C. to form the intermediate layer 15.

(Electrode Portion)

With respect to 100 mass % of the sum of the Si raw material and the SiC raw material shown in Table 2, there were mixed 0.4 mass % of hydroxypropylmethyl cellulose, 0.5 mass % of a surfactant, 7 mass % of glycerin, and 22 mass % of water with a vertical mixer to obtain slurry as an electrode portion-forming material. The slurry was sprayed on the intermediate layers 15 formed by spraying on the honeycomb structural section 4 of the two opposite positions on the side face to have a width of 60 mm and a thickness of 2 mm and then dried at 70° C. to form the electrode portions (paste electrodes) 21.

(Electrode Terminal Protrusion)

Next, using the Si raw material and the SiC raw material which are the same as those for the electrode, and 4 mass % of hydroxypropylmethyl cellulose and 28 mass % of water were added to them, and they were mixed. The mixture was kneaded to obtain an electrode terminal protrusion-forming raw material. A kneaded material was obtained from the electrode terminal protrusion-forming raw material with a vacuum kneader. The kneaded material was formed by the use of a vacuum kneader, machined to have an electrode terminal protrusion, and dried to obtain an electrode terminal protrusion-forming member. A drying condition was 70° C. The portion corresponding to the plate shape had a size of 3 mm×12 mm×15 mm. In addition, the portion corresponding to the protrusion has a circular columnar shape having a bottom face diameter of 7 mm and a length of 10 mm in the central axial direction. Two electrode terminal protrusion-forming members were produced.

Next, each of the two electrode terminal protrusion-forming members was bonded to each of the two portions where the electrode portion-forming raw material had been applied of the honeycomb formed body. The electrode terminal protrusion-forming members were bonded to the portions where the electrode portion-forming raw material had been applied of the honeycomb formed body by the use of the electrode portion-forming raw material. Then, the honeycomb formed body where the electrode portion-forming raw material had been applied and where the electrode terminal protrusion-forming members had been bonded was degreased, fired, and subjected to an oxidation treatment to obtain a honeycomb structure 100. The degreasing conditions were 550° C. and 3 hours. The firing conditions were 2 hours, 1450° C., and argon atmosphere. The oxidation conditions were 1300° C. and one hour.

Example 17

The slurry for the intermediate layer 15 which is the same as in Example 6 was sprayed on the unfired lateral electrodes of Example 6 having electrode terminal protrusions attached thereto, and it was dried at 70° C. Next, degreasing, firing, and an oxidation treatment were performed to obtain a honeycomb structure. The degreasing conditions were 550° C. and 3 hours. The firing conditions were 2 hours, 1450° C., and argon atmosphere. The oxidation conditions were 1300° C. and one hour. The structure resistance was 18Ω, and heat generation was good.

Comparative Examples 1 to 3

Comparative Examples having the constitution shown in Tables 1 and 2 were produced in the same manner as in Examples.

(Volume Electric Resistance)

The test pieces having a size of 10 mm×10 mm×50 mm were produced with the same material as targets to be measured (That is, the test pieces were produced with the same material as that of the honeycomb structural section 4 in the case of measuring the volume electric resistance of the honeycomb structural section 4 or the same material as that of the lateral electrode 23 in the case of measuring the volume resistance of the lateral electrode 23. The electrode portion 21 (paste electrode) and the electrode terminal protrusion 22, which were the lateral electrode 23, were produced with the same material.). The silver paste was applied on the entire faces of both the end portions of each test piece, and wiring was performed for current application. A voltage-applying current measurement apparatus was connected to the test piece, and a voltage was applied. A thermocouple was disposed in the central portion of the test piece, and the change of the temperature of the test piece with the passage of time while applying the voltage was confirmed with a recorder. The volume electric resistance was calculated from the value of the current flowing at the time that the temperature of the test piece reached 400° C. by applying a voltage of 600V, the voltage value, and the size of the test piece.

(Electric Resistance)

A thermocouple was disposed in the central portion of the honeycomb structure 100 to be able to record the temperature in the central portion of the honeycomb structure 100 with a recorder. A voltage-applying current measurement apparatus was connected to each of the two electrode terminal protrusions 22 of the honeycomb structure 100, and a voltage of 600V was applied. The current value of the voltage-applying current measurement apparatus at the time that the temperature of the central portion of the honeycomb structure 100 became 400° C. was read. The electric resistance (electric resistance between the lateral electrodes 23 and 23) of the honeycomb structure 100 was obtained from the voltage (600V) and the current value. The entire heat generation condition was observed with a thermography to observe the temperature distribution of heat generation. Tables 1 and 2 show the constitutions of Examples and Comparative Examples and the test results. Regarding the heat generation of Table 2, when the thermography temperature difference of the honeycomb end face at the time that the temperature of the central portion of the honeycomb structure 100 became 400° C. was below 100° C., "good" was given. When it was 100° C. or more, "bad" was given.

TABLE 1

| | Honeycomb structural section | | | | | | |
|---|---|---|---|---|---|---|---|
| | SiC | | Si | | | | |
| | Average particle diameter (μm) | Amount (mass %) | Average particle diameter (μm) | Amount (mass %) | Porosity (%) | Pore size (μm) | Volume electric resistance (Ω cm) |
| Example 1 | 3 | 60 | 6 | 40 | 51 | 2.3 | 35 |
| Example 2 | 3 | 70 | 6 | 30 | 54 | 2.1 | 40 |
| Example 3 | 3 | 70 | 6 | 30 | 54 | 2.1 | 40 |
| Example 4 | 10 | 65 | 6 | 35 | 43 | 4.1 | 26 |
| Example 5 | 10 | 70 | 6 | 30 | 45 | 4.0 | 35 |
| Example 6 | 10 | 80 | 6 | 20 | 47 | 3.9 | 69 |
| Example 7 | 20 | 70 | 6 | 30 | 36 | 8.5 | 8 |
| Example 8 | 40 | 70 | 6 | 30 | 30 | 19.0 | 1.1 |
| Example 9 | 20 | 85 | 6 | 15 | 40 | 8.2 | 15 |
| Example 10 | 20 | 90 | 6 | 10 | 55 | 3.4 | 34 |
| Example 11 | 10 | 70 | 6 | 30 | 45 | 4.0 | 35 |
| Example 12 | 10 | 70 | 6 | 30 | 45 | 4.0 | 35 |
| Example 13 | 10 | 70 | 6 | 30 | 45 | 4.0 | 35 |
| Example 14 | 10 | 70 | 6 | 30 | 45 | 4.0 | 35 |
| Example 15 | 10 | 70 | 6 | 30 | 45 | 4.0 | 35 |
| Example 16 | 10 | 70 | 6 | 30 | 45 | 4.0 | 35 |
| Comp. Ex. 1 | 10 | 70 | 6 | 30 | 45 | 4.0 | 40 |
| Comp. Ex. 2 | 30 | 70 | 6 | 30 | 28 | 24.2 | 0.6 |
| Comp. Ex. 3 | 1 | 70 | 6 | 30 | 62 | 0.7 | 101 |

| | Honeycomb structural section | | Intermediate layer | | | |
|---|---|---|---|---|---|---|
| | | | SiC | | Si | |
| | Rib thickness (μm) | Number of cells (cells/cm²) | Average particle diameter (μm) | Amount (mass %) | Average particle diameter (μm) | Amount (mass %) |
| Example 1 | 110 | 90 | 15 | 60 | 6 | 40 |
| Example 2 | 60 | 140 | 15 | 65 | 6 | 35 |
| Example 3 | 60 | 140 | 15 | 65 | 6 | 35 |
| Example 4 | 110 | 90 | 30 | 60 | 6 | 40 |
| Example 5 | 110 | 90 | 30 | 65 | 6 | 35 |
| Example 6 | 110 | 90 | 30 | 70 | 6 | 30 |
| Example 7 | 150 | 60 | 50 | 65 | 6 | 35 |
| Example 8 | 150 | 60 | 50 | 65 | 6 | 35 |
| Example 9 | 150 | 60 | 50 | 70 | 6 | 30 |
| Example 10 | 150 | 60 | 50 | 70 | 6 | 30 |
| Example 11 | 110 | 90 | 30 | 65 | 6 | 35 |
| Example 12 | 110 | 90 | 30 | 65 | 6 | 35 |
| Example 13 | 110 | 90 | 30 | 65 | 6 | 35 |
| Example 14 | 110 | 90 | 30 | 65 | 6 | 35 |
| Example 15 | 110 | 90 | 30 | 65 | 6 | 35 |
| Example 16 | 110 | 90 | 30 | 65 | 6 | 35 |
| Comp. Ex. 1 | 110 | 90 | | None | | |
| Comp. Ex. 2 | 150 | 90 | 50 | 65 | 6 | 35 |
| Comp. Ex. 3 | 110 | 90 | 15 | 65 | 6 | 35 |

TABLE 2

| | Lateral electrode | | | | | | | |
|---|---|---|---|---|---|---|---|---|
| | SiC | | Si | | | | | |
| | Average particle diameter (μm) | Amount (mass %) | Average particle diameter (μm) | Amount (mass %) | Al amount (mass %) | Mo amount (mass %) | Sn amount (mass %) | Zr amount (mass %) |
| Example 1 | 30 | 60 | 6 | 40 | 0 | 0 | 0 | 0 |
| Example 2 | 20 | 60 | 6 | 40 | 0 | 0 | 0 | 0 |
| Example 3 | 10 | 60 | 6 | 40 | 0 | 0 | 0 | 0 |
| Example 4 | 50 | 60 | 6 | 40 | 0 | 0 | 0 | 0 |
| Example 5 | 50 | 60 | 6 | 40 | 0 | 0 | 0 | 0 |
| Example 6 | 50 | 60 | 6 | 40 | 0 | 0 | 0 | 0 |
| Example 7 | 70 | 60 | 6 | 40 | 0 | 0 | 0 | 0 |

TABLE 2-continued

| | | | | | | | | |
|---|---|---|---|---|---|---|---|---|
| Example 8 | 50 | 60 | 6 | 40 | 0 | 0 | 0 | 0 |
| Example 9 | 60 | 60 | 6 | 40 | 0 | 0 | 0 | 0 |
| Example 10 | 50 | 60 | 6 | 40 | 0 | 0 | 0 | 0 |
| Example 11 | 50 | 60 | 6 | 35 | 5 | 0 | 0 | 0 |
| Example 12 | 50 | 60 | 6 | 35 | 0 | 5 | 0 | 0 |
| Example 13 | 50 | 60 | 6 | 35 | 0 | 0 | 5 | 0 |
| Example 14 | 50 | 60 | 6 | 35 | 0 | 0 | 0 | 5 |
| Example 15 | 50 | 60 | 6 | 20 | 20 | 0 | 0 | 0 |
| Example 16 | 50 | 60 | 6 | 30 | 5 | 5 | 0 | 0 |
| Comp. Ex. 1 | 50 | 60 | 6 | 40 | 0 | 0 | 0 | 0 |
| Comp. Ex. 2 | 60 | 60 | 6 | 40 | 0 | 0 | 0 | 0 |
| Comp. Ex. 3 | 30 | 60 | 6 | 40 | 0 | 0 | 0 | 0 |

| | Lateral electrode | | | Electric resistance of honeycomb structure ($\Omega$) | Heat generation |
|---|---|---|---|---|---|
| | Porosity (%) | Pore size ($\mu$m) | Volume electric resistance ($\Omega$ cm) | | |
| Example 1 | 37 | 15 | 0.78 | 12 | Good |
| Example 2 | 39 | 11 | 1.34 | 29 | Good |
| Example 3 | 40 | 10 | 1.72 | 26 | Good |
| Example 4 | 35 | 21 | 0.61 | 7 | Good |
| Example 5 | 35 | 21 | 0.61 | 11 | Good |
| Example 6 | 35 | 21 | 0.61 | 21 | Good |
| Example 7 | 33 | 34 | 0.37 | 2.2 | Good |
| Example 8 | 35 | 21 | 0.61 | 1.1 | Good |
| Example 9 | 34 | 25 | 0.48 | 3.9 | Good |
| Example 10 | 35 | 21 | 0.61 | 10.5 | Good |
| Example 11 | 33 | 24 | 0.38 | 10 | Good |
| Example 12 | 34 | 25 | 0.40 | 10 | Good |
| Example 13 | 33 | 23 | 0.41 | 10 | Good |
| Example 14 | 34 | 24 | 0.42 | 10 | Good |
| Example 15 | 32 | 24 | 0.35 | 9 | Good |
| Example 16 | 32 | 25 | 0.37 | 9 | Good |
| Comp. Ex. 1 | 35 | 21 | 0.61 | 16 | Bad |
| Comp. Ex. 2 | 35 | 25 | 0.48 | 0.7 | Bad |
| Comp. Ex. 3 | 37 | 15 | 0.78 | 33 | Bad |

(Test Result)

Since Comparative Example 1 had a large interface resistance between the electrode portion 21 of the lateral electrode and the honeycomb structural section 4, heat generation at the electrode portion 21 was high, and heat generation was non-uniform. In Comparative Example 2, since the electric resistance of the honeycomb structural section 4 was too low, the voltage could not be raised, and uniform heat generation could not be obtained. In Comparative Example 3, since the electric resistance of the honeycomb structural section 4 was too high, a sufficient current did not flow, and therefore temperature could not be raised within the predetermined time. In the Examples 1 to 16 having intermediate layers 15 formed thereon, the temperature could be raised almost uniformly within the predetermined time by controlling the voltage.

INDUSTRIAL APPLICABILITY

A honeycomb structure of the present invention can suitably be used as a carrier for a catalytic device for purifying exhaust gas discharged from the internal combustion engine in various fields of chemistry, electricity, iron and steel, and the like.

DESCRIPTION OF REFERENCE NUMERALS

1: partition wall, 2: cell, 3: outer peripheral wall, 4: honeycomb structural section, 5: side face, 11: one end face, 12: the other end face, 15: intermediate layer, 15*a*: surface layer, 21: electrode portion, 22: electrode terminal protrusion, 22*a*: substrate, 22*b*: protrusion, 23: lateral electrode, 100, 200, 300: honeycomb structure, O: central portion, R: peripheral direction

The invention claimed is:

1. A honeycomb structure comprising:
a cylindrical honeycomb structural section having porous partition walls separating and forming a plurality of cells functioning as fluid passages and extending over from one end face to the other end face and an outer peripheral wall located in the outermost periphery,
a pair of lateral electrodes disposed on a side face of the honeycomb structural section, and
at least one intermediate layer between the honeycomb structural section and each of the pair of lateral electrodes;
wherein each of the honeycomb structural section, the pair of lateral electrodes and the at least one intermediate layer contain silicon carbide particles as a framework material and silicon as a bonding material for bonding the silicon carbide particles together,
the silicon carbide particles as the framework material for the honeycomb structural section have an average particle diameter of 3 to 40 $\mu$m, and the ratio (Si/SiC) of silicon (Si) to silicon carbide (SiC) is 10/90 to 40/60,
the pair of lateral electrodes have an average particle diameter of the silicon carbide particles of 10 to 70 $\mu$m, and the ratio (Si/SiC) of silicon (Si) to silicon carbide (SiC) is 20/80 to 50/50,
the at least one intermediate layer has an average particle diameter of the silicon carbide particles of 3 to 70 $\mu$m and a ratio of silicon (Si) to silicon carbide (SiC) of 10/90 to 50/50, and an electric resistance between the lateral electrodes is 2 to 100Ω.

2. The honeycomb structure according to claim 1, wherein the intermediate layer has an average particle diameter of the silicon carbide particles of 15 to 50 μm and a ratio of silicon (Si) to silicon carbide (SiC) of 30/70 to 40/60.

3. The honeycomb structure according to claim 1, wherein the honeycomb structural section has a porosity of 30 to 60%, an average pore size of 2 to 20 μm, a partition wall thickness of 50 to 200 μm, and a cell density of 50 to 150 cells/cm$^2$.

4. The honeycomb structure according to claim 2, wherein the honeycomb structural section has a porosity of 30 to 60%, an average pore size of 2 to 20 μm, a partition wall thickness of 50 to 200 μm, and a cell density of 50 to 150 cells/cm$^2$.

5. The honeycomb structure according to claim 1, wherein the lateral electrode and/or the intermediate layer contain(s) at least one of aluminum, molybdenum, tin, and zirconium.

6. The honeycomb structure according to claim 2, wherein the lateral electrode and/or the intermediate layer contain(s) at least one of aluminum, molybdenum, tin, and zirconium.

7. The honeycomb structure according to claim 3, wherein the lateral electrode and/or the intermediate layer contain(s) at least one of aluminum, molybdenum, tin, and zirconium.

8. The honeycomb structure according to claim 4, wherein the lateral electrode and/or the intermediate layer contain(s) at least one of aluminum, molybdenum, tin, and zirconium.

9. The honeycomb structure according to claim 1, wherein a surface layer having the same composition as the intermediate layer is provided on a surface of the lateral electrode.

10. The honeycomb structure according to claim 2, wherein a surface layer having the same composition as the intermediate layer is provided on a surface of the lateral electrode.

11. The honeycomb structure according to claim 3, wherein a surface layer having the same composition as the intermediate layer is provided on a surface of the lateral electrode.

12. The honeycomb structure according to claim 4, wherein a surface layer having the same composition as the intermediate layer is provided on a surface of the lateral electrode.

13. The honeycomb structure according to claim 5, wherein a surface layer having the same composition as the intermediate layer is provided on a surface of the lateral electrode.

14. The honeycomb structure according to claim 6, wherein a surface layer having the same composition as the intermediate layer is provided on a surface of the lateral electrode.

15. The honeycomb structure according to claim 7, wherein a surface layer having the same composition as the intermediate layer is provided on a surface of the lateral electrode.

16. The honeycomb structure according to claim 8, wherein a surface layer having the same composition as the intermediate layer is provided on a surface of the lateral electrode.

* * * * *